United States Patent
David et al.

(10) Patent No.: US 10,275,591 B2
(45) Date of Patent: *Apr. 30, 2019

(54) CONTEXT-BASED SECURE CONTROLLER OPERATION AND MALWARE PREVENTION

(71) Applicant: Karamba Security, Hod Hasharon (IL)

(72) Inventors: Tal Efraim Ben David, Hogla (IL);
Assaf Harel, Ramat Hasharon (IL);
Amiram Dotan, Birmingham, MI (US);
David Barzilai, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,987

(22) Filed: Jun. 19, 2018

(65) Prior Publication Data
US 2018/0307826 A1 Oct. 25, 2018

Related U.S. Application Data

(63) Continuation of application No. 15/758,234, filed as application No. PCT/IB2016/055337 on Sep. 7, 2016.
(Continued)

(51) Int. Cl.
*G06F 21/44* (2013.01)
*G06F 21/12* (2013.01)
(Continued)

(52) U.S. Cl.
CPC ............ *G06F 21/44* (2013.01); *G06F 21/121* (2013.01); *H04L 63/123* (2013.01); *H04L 63/20* (2013.01);
(Continued)

(58) Field of Classification Search
CPC .................................. G06F 21/44; H04L 63/20
(Continued)

(56) References Cited

U.S. PATENT DOCUMENTS 9,059,978 B2 * 6/2015 Kotani ...................... G06F 8/65
2013/0097708 A1 4/2013 Jayanthi et al.
(Continued)

OTHER PUBLICATIONS

PCT International Preliminary Report on Patentability in International Application No. PCT/IB2016/055337, dated Mar. 22, 2018.
(Continued)

*Primary Examiner* — Jason K Gee
*Assistant Examiner* — Dereena T Cattungal
(74) *Attorney, Agent, or Firm* — Finnegan, Henderson, Farabow, Garrett & Dunner, LLP

(57) ABSTRACT

In one implementation, a method for providing security on an externally connected controller includes launching, by the controller, a security layer that includes a whitelist of permitted processes on the controller, the whitelist including (i) signatures for processes that are authorized to be executed and (ii) context information identifying permitted controller contexts within which the processes are authorized to be executed; determining, by the security layer, whether the particular process is permitted to be run on the controller based on a comparison of the determined signature with a verified signature for the particular process from the whitelist; identifying, by the security layer, a current context for the controller; determining, by the security layer, whether the particular process is permitted to be run on the controller based on a comparison of the current context with one or more permitted controller contexts for the particular process from the whitelist.

12 Claims, 9 Drawing Sheets

Related U.S. Application Data

(60) Provisional application No. 62/215,065, filed on Sep. 7, 2015.

(51) Int. Cl.
*H04L 29/06* (2006.01)
*H04L 29/08* (2006.01)

(52) U.S. Cl.
CPC ...... *H04L 67/12* (2013.01); *G06F 2221/2101* (2013.01); *H04L 2209/84* (2013.01)

(58) Field of Classification Search
USPC .......................................................... 713/176
See application file for complete search history.

(56) References Cited

U.S. PATENT DOCUMENTS

| | | |
|---|---|---|
| 2013/0227561 A1 | 8/2013 | Walsh et al. |
| 2013/0287208 A1 | 10/2013 | Chong et al. |
| 2014/0215220 A1* | 7/2014 | Kim ........................ G06F 21/50 713/176 |
| 2014/0380503 A1* | 12/2014 | Matsushima ........... G06F 21/14 726/27 |
| 2015/0150124 A1* | 5/2015 | Zhang ................. H04L 63/1408 726/22 |
| 2016/0352712 A1* | 12/2016 | Tamp ..................... H04L 63/08 |
| 2017/0041290 A1* | 2/2017 | Ning ................... H04L 63/0209 |
| 2017/0147812 A1* | 5/2017 | Ujiie ................... B60R 16/0231 |

OTHER PUBLICATIONS

PCT International Search Report and Written Opinion in International Application No. PCT/IB2016/055337, dated Nov. 10, 2016.

Studnia et al., "Survey on security threats and protection mechanisms in embedded automotive networks," 2013 43rd Annual IEEE/IFIP Conference on Dependable Systems and Networks Workshop, Jun. 2013, pp. 1-12.

* cited by examiner

| # | Name | Type | Digital Sign | Context |
|---|------|------|--------------|---------|
| 1 | uConnect | Binary file | 1AB542FD33 | Init |
| N | volume.lua | Script File | 9233DFE33 | All |

FIG. 3

```
<process_Execution_commands>(..., <process>, ... ,<binary_code>, ... )
{
    if (<currnt_vehicle_context> <doesn't match> <process context
                                                 from whitelist>)
    {
        <return_value> <error_out_of_context>;
    }
    <signature> = <local calculation of digital signature>
    if (<signature> <doesn't match> <process signature from whitelist>)
    {
        <return_value> <error_malicious>;
    }
    // continue with normal execution
    .
    .
    .
}
```

FIG. 4

CONTEXT-BASED SECURE CONTROLLER OPERATION AND MALWARE PREVENTION

CROSS-REFERENCE TO RELATED APPLICATIONS

This application is a continuation of U.S. patent application Ser. No. 15/758,234 filed Mar. 7, 2018, which is a U.S. National Stage application claiming priority to PCT Application no. PCT/IB2016/055337 filed Sep. 7, 2016, which claims priority under to U.S. Provisional Patent Application No. 62/215,065, titled "SYSTEM AND METHODS FOR SECURING AN AUTOMOTIVE CONTROLLER," which was filed on Sep. 7, 2015, the entire contents of each of which are hereby incorporated herein by reference.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber attacks come in many forms and flavors, but they generally share the same basic concepts: find a preexisting security bug (vulnerability) in the system's software, exploit it, and run malware. A common security bugs is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be generated and added to controllers with security layers, which can use the security policies and layers to ensure that only valid code and valid behaviors are allowed to run on the controllers. Various features can be used to ensure controllers are limited to operating with valid code and valid behaviors, such as using whitelists that define permitted code and to define permitted contexts within which the code can run.

For example, ECUs on a car can each include a custom security policy that defines whitelisted processes and contexts within which those processes are permitted to run. When an ECU encounters a process that is not authorized to run or that is operating outside of its permitted context, the ECU can block the process from operating. Automotive ECUs can use any of a variety of different contexts to determine whether a process is operating within its permitted bounds, such as location-based contexts (e.g., GPS location, street, home, work, freeway, parking lot, garage), proximity contexts (e.g., nearby objects, distance to approaching objects, speed and trajectory relative to other moving objects), operational contexts (e.g., driving, parked, current speed, in drive, in reverse, idle), user-related contexts (e.g., connected devices, current infotainment system usage, automated systems enabled by the user, such as cruise control, parking assist, driving assist), and/or other contexts. By using context-based whitelists to determine whether and when to permit particular processes to operate, ECUs can maintain secure operation and prevent the attacks from ever infiltrating the IoT device's infrastructure, such as a car's Controller Area Network (CAN Bus).

By focusing on hardening the controllers within IoT devices/systems that are open to external access (via the Internet, WiFi, Bluetooth, etc.)—meaning restricting the operations and behavior of the controllers to a set of expected operations and behaviors—the controllers can be transformed from potential security vulnerabilities into gates that prevent and block hacker attempts to get into the controller's internal infrastructure, essentially stopping hacker attacks on IoT devices. Endpoint security layers can stop attacks on controller by blocking hackers at the gate using context-based whitelists—meaning an externally facing entry point into a device and/or system, such as at externally facing ECUs in an automobile that, if compromised, could provide access to the CAN Bus. As a result, attacks cannot make it inside of an IoT device/system, which can prevent access to and control of an IoT device/system's functions.

Context-based secure controller operation and malware prevention can be integrated through endpoint security clients incorporated into the operating system of controllers programmed to implement one or more security layers, such as whitelist enforcement layer. Whitelist layers can use signatures for binary (and/or script) codes on the system, which kernel modules can be checked against upon execution to verify their authenticity, and can include permitted contexts within which the binary codes (and/or scripts) can operate on particular controllers. Additional whitelist layers can also be used. When operation is detected outside of the approved context included in a custom security policy for a controller, it can indicate that that a malware is attempting exploit a vulnerability (i.e., software bug) on the controller to run unauthorized code in memory, and can be blocked and reported.

In one implementation, a method for providing security on an externally connected controller includes launching, by the controller, a kernel level security layer that includes a whitelist of permitted processes on the controller, the whitelist being part of a custom security policy for the controller and including (i) signatures for processes that are authorized to be executed by the controller and (ii) context information identifying permitted controller contexts within which the processes are authorized to be executed by the controller; receiving, at the security layer, a request to run a particular process; determining, by the security layer, a signature for the particular process; determining, by the security layer, whether the particular process is permitted to be run on the controller based on a comparison of the determined signature with a verified signature for the particular process from the whitelist; identifying, by the security layer, a current context for the controller; determining, by the security layer, whether the particular process is permitted to be run on the controller based on a comparison of the current context with one or more permitted controller contexts for the particular process from the whitelist; and blocking, by the security layer, the particular process from running on the automotive controller based on determining one or more of: the determined signature not matching the verified signature for the process and the current context not being included in the one or more permitted controller contexts.

Such an implementation can optionally include one or more of the following features. The whitelist can be generated for the controller based on static analysis of an operating system for the controller. The method can further include reporting, by the controller and to a server system, information that identifies the particular process as being blocked, wherein the information is reported to the server system without the particular process being executed by the controller and without prior transmission with the server system regarding the particular process. The controller can be an automotive electronic control unit (ECU). The ECU can be selected from the group consisting of: an infotainment controller, a telematics controller, a main computer controller, an ABS system controller, a navigation system controller, a communication system controller, a braking system controller, an air bag system controller, and a wheel pressure controller. The one or more permitted contexts can include one or more of: an initiation state, a shutdown state, an operational state, and in motion state.

In another implementation, a system for securely executing an externally connected controller can include memory storing a whitelist; and a controller programmed to: launch a kernel level security layer that uses the whitelist defining permitted processes on the controller, the whitelist being part of a custom security policy for the controller and including (i) signatures for processes that are authorized to be executed by the controller and (ii) context information identifying permitted controller contexts within which the processes are authorized to be executed by the controller; receive a request to run a particular process; determine a signature for the particular process; determine whether the particular process is permitted to be run on the controller based on a comparison of the determined signature with a verified signature for the particular process from the whitelist; identifying a current context for the controller; determine whether the particular process is permitted to be run on the controller based on a comparison of the current context with one or more permitted controller contexts for the particular process from the whitelist; and block the particular process from running on the controller based on determining one or more of: the determined signature not matching the verified signature for the process and the current context not being included in the one or more permitted controller contexts.

Such an implementation can optionally include one or more of the following features. The whitelist can be generated for the controller based on static analysis of an operating system for the controller. The controller can further be programmed to report, to a server system, information that identifies the particular process as being blocked, wherein the information is reported to the server system without the particular process being executed by the controller and without prior transmission with the server system regarding the particular process. The controller can be an automotive electronic control unit (ECU). The ECU can be selected from the group consisting of: an infotainment controller, an telematics controller, a main computer controller, an ABS system controller, a navigation system controller, a communication system controller, a braking system controller, an air bag system controller, and a wheel pressure controller. The one or more permitted contexts can include one or more of: an initiation state, a shutdown state, an operational state, and in motion state.

Certain implementations can provide one or more of the following advantages. For example, endpoint controller security can permit detection that is much earlier than network-based solutions, which often are not able to detect that malware has compromised a controller until after the malware has had a chance to run. In contrast, endpoint security detects the malware that is not authorized and/or that is operating outside of its permitted context before it has a chance to run on a controller, which not only prevents the malware from ever being executed but also determines that an operation is malware before it has been executed.

In another example, rather than looking for hackers that are already in an IoT device/system's internal network (e.g., CAN Bus, internally-facing controllers), the disclosed technology can detect and stop an attack from getting into the internal network (e.g., CAN Bus, other controllers) in the first place. For example, the disclosed end-point solution can protect externally connected controllers, which can allow for early detection and identification of threats targeting the IoT device/system and blocking exploits from infiltrating its internal components, which can ensure device/system and/or user safety.

Additional and/or alternative advantages are also possible, as described below.

BRIEF DESCRIPTION OF THE ATTACHMENTS

FIG. 3 depicts is an example process whitelist.

FIG. 4 is example pseudocode for implementing context-based whitelists on a controller.

Like reference numbers and designations in the various drawings indicate like elements.

DETAILED DESCRIPTION

IoT devices with controllers, such as cars, are vulnerable to hackers that can take control of controllers remotely. A common way to do that is to use a known exploit in one of the software processes running on one of the controllers. However, such exploits usually provide the ability to execute a binary code too small to cause any damage to the IoT device, such as a car. A more common approach is for that small footprint code to download and spawn a large footprint code and execute it as a privileged process. The downloaded malware can be used to take control of the IoT device, which can endanger users, such as the driver and passengers in a car with controllers (e.g., ECUs) that have been compromised.

Whitelisting is a form of security that uses a list of binary processes that are allowed to run on an endpoint system with signed digital signatures (e.g., md5 or sha-1 hashes, cryptographic public I private key based signatures, checksums, etc.). An endpoint operating system can be modified to implement a whitelist (e.g., by patching the OS, adding a kernel module, or other alternatives) that allows only properly signed binaries to be executed. This approach can provide a good protection against malware (even malware that has never been seen or analyzed before) that injects a new binary and tries to launch it, since the malicious process binary is not signed and the OS can simply reject that malicious launch attempt.

A whitelist approach can be used for controllers on IoT devices, such as vehicles. Each car controller spawns a unique set of binary processes that is infrequently updated, and can be easily digitally signed to ensure its authenticity, and counter attack any malicious attempt. Moreover, as most malware have to bring their own malicious binary software to run on the attacked controller, whitelisting can be considered a security mechanism that provides total security for the vehicle systems.

Figure 1A:
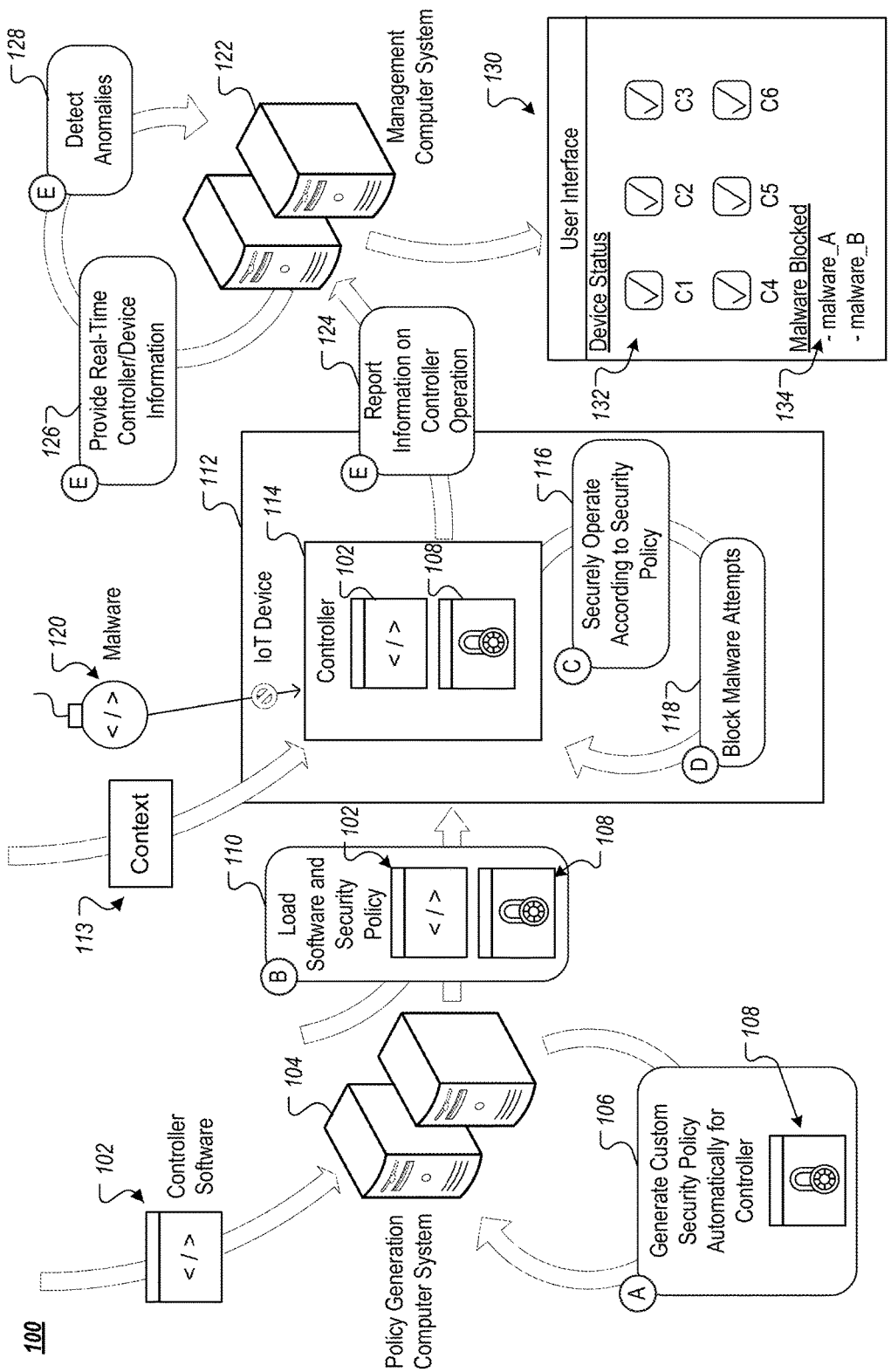
FIG. 1A is a conceptual diagram of an example system for generating and implementing a custom security policy on an example controller.

FIG. 1A is a conceptual diagram of an example system 100 for generating and implementing a custom context-based security policy on an example controller. The example system 100 includes a policy generation computer system 104 (e.g., computer server system, cloud computing system, client computing device) that is programmed to generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), wired networks, wireless networks, mobile data networks, or any combination thereof.

The policy generation computer system 104 can receive controller software 102, which can include an operating system and/or applications that are to be run on a controller. The policy generation computer system 104 can use the controller software to automatically generate a custom context-based security policy 108 for the controller that is to execute the software 102, as indicated by step A (106). For example, the computer system 104 can analyze the software 102 to determine a set of operations and contextual behaviors that are expected during operation of a controller according to the software 102 (e.g., identify a list of authorized binaries, identify a set of contexts within which each of the binaries are authorized to operate) and can incorporate those operations and contextual behaviors into the custom security policy 108, which may include one or more whitelists of permitted operations and/or behaviors. Generating the security policy can additionally include generating one or more signatures for components of the controller software 102, such as processes/functions that are part of the software 102, that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108, as indicated by step C (116). For example, the security policy 108 can include whitelists (and other information) that designate authorized contextual behaviors and operations for the controller 114 that are within expected behavior given a current context 113 for the IoT device 112, according to the controller software 102. The context 113 can be determined by the controller 114 based on information received and/or detected about the current state of the IoT device 112 and its surroundings, such as through information detected by sensors/devices (e.g., proximity sensors, accelerometers, gyroscopes, GPS chipset), obtained from other controllers and/or devices (e.g., infotainment system, navigation system, other onboard systems, vehicle-to-vehicle communication network, remote computer system, other external devices/systems). Behaviors/operations that deviate from those authorized behaviors/operations can be prevented from occurring based on the security policy 108 (e.g., authorized processes, authorized contexts for the processes to operate within) hardening the controller 114 against such behaviors/operations.

For example, the controller software 102 can include one or more portions of code that make the controller 114 unsecure, which can potentially affect the security of not only the controller 114 but the device 112 (and other devices to which it is connected). Security vulnerabilities can come in any of a variety of different types, such as buffer overrun vulnerabilities through which a hacker could potentially modify the software stack to cause malware 120 to be loaded onto and executed by the controller 114. By operating according the security policy 108 on the controller 114, such malware attempts can be blocked before the malware 120 is loaded/executed by the controller 114, as indicated by step D (118). For example, if the IoT device 112 is an ECU on an automobile, the policy 108 can define a particular set of processes that are authorized and a particular set of contexts within which those processes on the automobile can be executed by the controller 114. For instance, an automatic parking process that automatically parks a car (e.g., parallel parking) may be restricted to particular contexts for the automobile, such as the automobile being stopped and being located on a street or in a parking lot. The whitelist can then restrict execution of the automatic parking process to contexts that are permitted (e.g., car stopped, car located on street or in parking lot), and can block attempts to execute the process outside of the whitelisted contexts (e.g., block attempts to execute the automatic parking process when the car is travelling at a high rate of speed or is located on a highway). Processes being executed outside of their expected contexts can indicate a possible malware or hacking attack, and can be blocked by the controller 114 using the security policy 108 (defining permitted contexts) before the attempts are able to take root on the controller 114.

Such hardening of the controller 114—meaning restriction of the controller 114 to specific behaviors/operations outlined in the security policy 108—can provide endpoint security that provides a variety of benefits. For example, it can allow for early warning of attacks by identifying attack attempts before they are able to install/run the malware 120 on the controller 114. It can also stops attacks at the gate—meaning preventing attacks from making it onto the controller 114 and the device 112 (as opposed to other security solutions that attempt to identify malware once it has already been installed/run on a controller). It can eliminate false positives (incorrect identification of attacks) by restricting operation of the controller 114 to only the code and applications that have explicit permission to run on the controller, which can eliminate potential ambiguity (e.g., either the code is part of the factory settings or not). It can also eliminates risk of the policy 108 becoming security vulnerability itself by being outdated. For instance, by custom generating the security policy 108 to match the current version of the controller software 102, the security policy 108 can continue to harden the controller 114 as the controller software 102 is updated over time. Additionally, this is in contrast to other security policies that may use blacklists seeking to identify and prevent particular malware. Such blacklists may require constant updating and may continually run the risk of being outdated, which can expose the controller 114 to potential vulnerabilities. By using whitelists in the security policy 108 that outline permitted behaviors/operations, the security policy 108 can continue to protect the controller 114 even when new and yet unknown malware attempts are launched against the controller 114 and device 112. Quality checks can also be minimized, which can reduce time for deployment and updates. For example, endpoint security layers can be isolated within the controller 114, so there may not be a need to rest the operation of the entire device 112 (or other devices connected to the device 112) as part of the security layer deployment.

The controller 114 can log information about its operation, including blocked malware attempts as well as information on secure operation of the controller 114 over time, including contexts for the controller 114 and the device 112 while various processes are executed. Traces of blocked malware attempts can include a variety of information, such as the malware itself, the origin of the malware (e.g., IP address from which the malware originated), the context of the device 112 and/or controller 114 when the malware attempt was blocked, and information identifying the code segment that provided the malware exploit. The controller 114 can report information on controller operation, as indicated by step E (124). Such reporting can be provided in real-time. For example, the controller 114 can report malware traces in response to the malware 120 is attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers, as well as other information (e.g., device/controller context when the malware was blocked). The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a particular context for a particular process that is a statistical outlier outside of the normal operation of a controller.

Figure 1B:
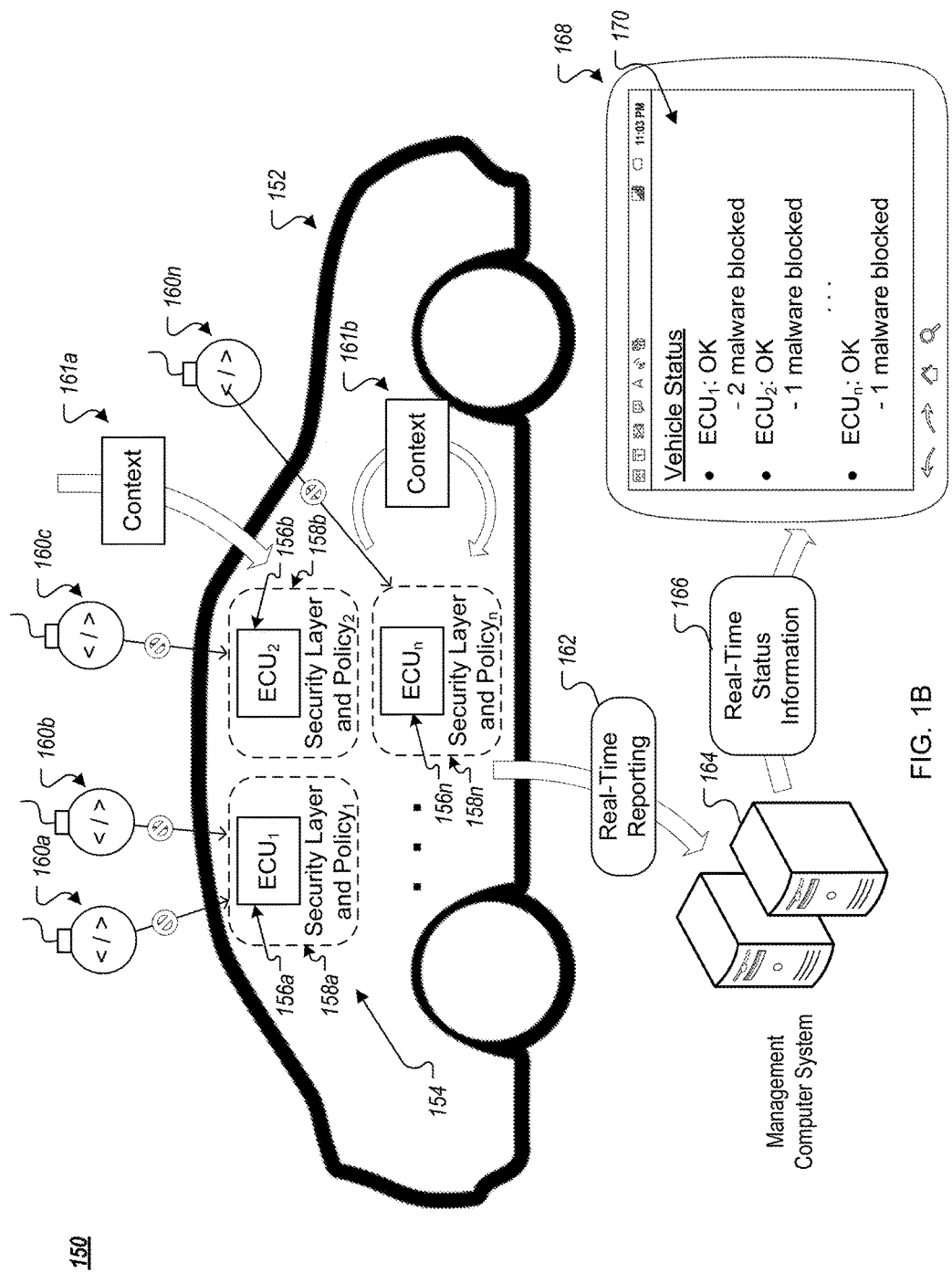
FIG. 1B is a conceptual diagram of an example system for implementing generating and implementing custom security policies on example ECUs that are part of an example vehicle.

FIG. 1B is a conceptual diagram of an example system 150 for implementing generating and implementing custom context-based security policies on example ECUs that are part of an example vehicle 152. The example system 150 is an example implementation of the system 100 to a specific IoT context, which in this example is the vehicle 152. The system 100 and the system 150 can be implemented on a variety of other IoT devices and systems.

In this example, the vehicle 152 includes a control system 154 that includes multiple ECUs 156a-n that each have their own custom security policy 158a-n, which each define authorized processes and authorized contexts for the processes. Although not depicted, the security policies 158a-n can be generated in a similar manner described above with regard to FIG. 1A and the policy generation computer system 104. The security policies 158a-n can harden the ECUs 156a-n and can effectively block malware attempts 160a-n, which can be attempts by hackers to find a way into the CAN Bus of the vehicle 152. While the vehicle 152 can include over a hundred ECUs connected to the CAN Bus, only a few may be open externally (accessible to external networks outside of the vehicle 152, such as the internet). These external ECUs (e.g., ECUs 156a-n) can be the gateways into the car and the security policies 158a-n can stop attackers at these gateways, which can significantly reduce, if not eliminate, the risk of attacks penetrating the car's network, which can disrupt the car's operation.

For example, the security policies 158a-n can include whitelists for permitted program binaries, processes, scripts, network behavior, and/or other devices, and can be embedded within the ECUs 156a-n to ensure only explicitly allowed code and contextually-approved behaviors for the code may run on it. By using the security policies 158a-n that are specific to the ECUs 156a-n, any processes or functions that are outside of the ECUs permitted/designed operating behavior can be immediately detected and stopped from running on the ECUs 156a-n. This can allow for the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding an endpoint security layers and policies 158a-n to ECUs 156a-n so that they use policies outlining whitelists of permitted processes, binaries, etc., and outlining permitted contexts within which the permitted processes are able to operate, the ECUs 156a-n are able to detect the unexpected behavior or operation of a dropper and immediately report on the attack attempt in real-time, as indicated by step 162. The early warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source, path, and context of the vehicle 152 and/or ECUs 156a-n when the attack was blocked, so vulnerabilities can be fixed and blocked to prevent any malware from infiltrating the CAN Bus on the vehicle 152.

Dropper and other hacker attempts to introduce the malware 160a-n on the externally connected ECUs 156a-n can be detected by the endpoint security layers and policies 158a-n as foreign code based on external contexts 161a and/or internal contexts 161b for the vehicle 152, and can be blocked when they attempts to run. External contexts 161a can include, for example, the position and movement of the vehicle 152 with regard to other objects (e.g., nearby vehicles, nearby buildings, intersections) and/or location information (e.g., global position, relative location for user, such as home, work, garage). Internal contexts 161b can include, for example, the use and status of systems within the vehicle, such as infotainment and navigation systems, and the status of other controllers within the vehicle 152. For instance, such droppers and other hacker attempts are not part of the factory settings for the ECUs 156a-n and/or that are attempting to operate processes on the ECUs 156a-n that are outside of their permitted contexts can be blocked from running by the security layers and policies 158a-n, which can stop them from running and prevent them from doing anything to disrupt the safe operation of the vehicle 152. If a dropper does succeed in dropping the malware 160a-n onto the externally connected ECUs 156a-n, when the malware 160a-n attempt to run on the ECUs 156a-n, the endpoint security layer and policies 158a-n can detect it as foreign code and block its attempts to run.

Endpoint security layers (e.g., security policy 108, security layer and policies 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security will be hardened against the cyber threats targeting them.

Figure 2:
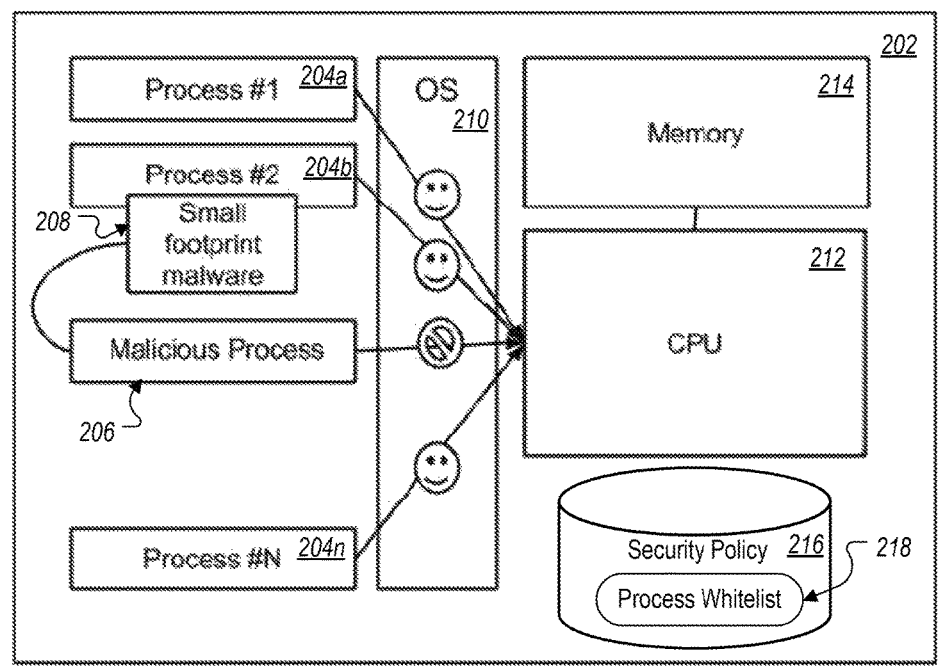
FIG. 2 depicts an example implementation of process verification by a security middleware layer on a controller, such as an example of a running environment in a typical car controller.

FIG. 2 depicts an example implementation of process verification by a security middleware layer on a controller, such as an example of a running environment in a typical car controller. An example system 200 is depicted with an example controller 202 using a whitelist 218 (e.g., process signatures, process contexts) that is part of a custom security policy 216 for the controller 202 to block a malicious process 206. In this example, the processes #1-#N (204a-n) are included on the whitelist 218 for the controller 202 and are operating within their permitted contexts, but the process #2 has a known exploit that is used by hackers to implant a small footprint malware 208 that then, if executed, could download a larger malicious binary that may be launched as a privileged process. A whitelist security agent that is part of a security middleware layer that is implemented by the OS 210 can block the small footprint malware 208 and the larger the malicious process 206 from being executed by the controller 202 because they are not included in the whitelist 218 and/or they are attempting to operate the process 204b (with a known exploit) outside of its permitted context— effectively blocking the malicious process 206 and the small footprint malware 208 from being executed by the CPU 212 and used to corrupt the memory 214 (e.g., buffer overrun attack).

For example, the whitelist 218 can include permitted contexts among the whitelisted processes/programs/binaries/scripts/etc. that can be referenced to determine whether operations being performed by the controller 202 are within the expected/known parameters and should be permitted or blocked. The security middleware layer can, for example, integrate with the OS 210 program loading and file access services. The security middleware layer can perform whitelist operations for any of a variety of processes and/or applications, such as executable files, shared objects (libraries), scripts, and/or other binaries/objects that are executable by the controller 202. For example, every time a process (e.g., an executable file, a shared object (library), a script, and/or other binary/object) is loaded, the process's SHA256 signature can be calculated and compared to a database of approved process signatures (whitelist 218), and the context for the controller 202 can be determined and compared against a list of approved context within which the process can be executed by the controller 202. If the process is approved, it will be allowed to run and will run normally on the controller 202 without any interference. If a process's signature does not exist in the whitelist database 218, the loading process can be aborted and an appropriate audit log entry can be written.

The incorporation of contextual-based authentication of processes on the controller 202 can provide a variety of advantages over whitelists that do not incorporate contexts. For example, binary process authorization through whitelists can be binary—either the process is authenticated or it is not—and may not be granular enough in the sense that processes load binary libraries, textual scripts and configuration files as part of their normal functionality. Moreover, processes use OS 210 resources such as hardware devices and network ports without guaranteeing their authenticity. This can create an attack vector to replace such a binary library, text file or OS resource with a malicious one, and have the whitelisted-verified process execute it naively and unknowingly perform a malicious action.

Given that whitelists can be deterministic by nature—meaning, a binary process can either run or not run—context can be used to allow the vehicle to better determine whether a process is behaving correctly based on the vehicle's operational state. For example, some processes should only be allowed to run when the car is starting, but should be considered malicious afterwards. For example, built-in-tests are allowed during maintenance and service, but should not be allowed during normal driving. These example contextual whitelists for processes can help the controller 202 avoid malicious use of otherwise authenticated processes that, without context, might go undetected.

The process whitelist 218 can include, for example, whitelist elements with at least these fields:
1. Name
2. Type {Binary file/Binary library/Script file/Configuration file/Hardware resource}
3. Digital Signature
4. Context {Initiation state/Shutdown state/Operational state/In motion state/Context1/ . . . /Context N/All}

Additionally, context-based whitelist checks can be performed with increased granularity on the controller 202 to ensure that authorized processes operate within their approved bounds. For example, granular context-based whitelisting can include checks being added for the following operations by the controller 202:
1. File Open operations: during any load of Configuration and Script files. Digital signature and context can be verified by the controller 202.
2. Load Library Qperarions: during any load of Binary libraries. Digital signature and context can be verified by the controller 202.
3. OS resource operations: during any interaction with hardware devices or network ports. Digital signature and context can be verified by the controller 202.

Figure 3:
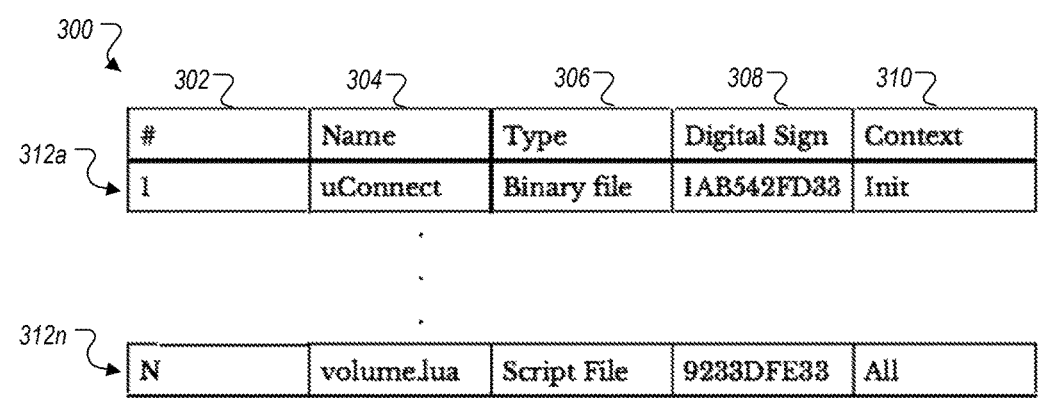

FIG. 3 depicts is an example process whitelist 300. The example whitelist 300 includes a number of fields for each process, such as a unique identifier 302 (e.g., system-level process identifier), a process name 304 (e.g., name of the executable file), a file type 306 (e.g., binary, script, executable library), a digital signature 308 (e.g., SHA256 signature, checksums, cyclic redundancy check (CRC) signature), and permitted context 310 (e.g., initiation state, shutdown state, operational state, in motion state, specific context N, all). The whitelist 300 can be maintained, for example, on the controller 202 using one or more security features, such as being stored as read only with root level permissions and/or being encrypted on the controller 202. Example entries 312a-n in the whitelist 300 are also depicted.

FIG. 4 is example pseudocode for implementing context-based whitelists on a controller.

Figure 5:
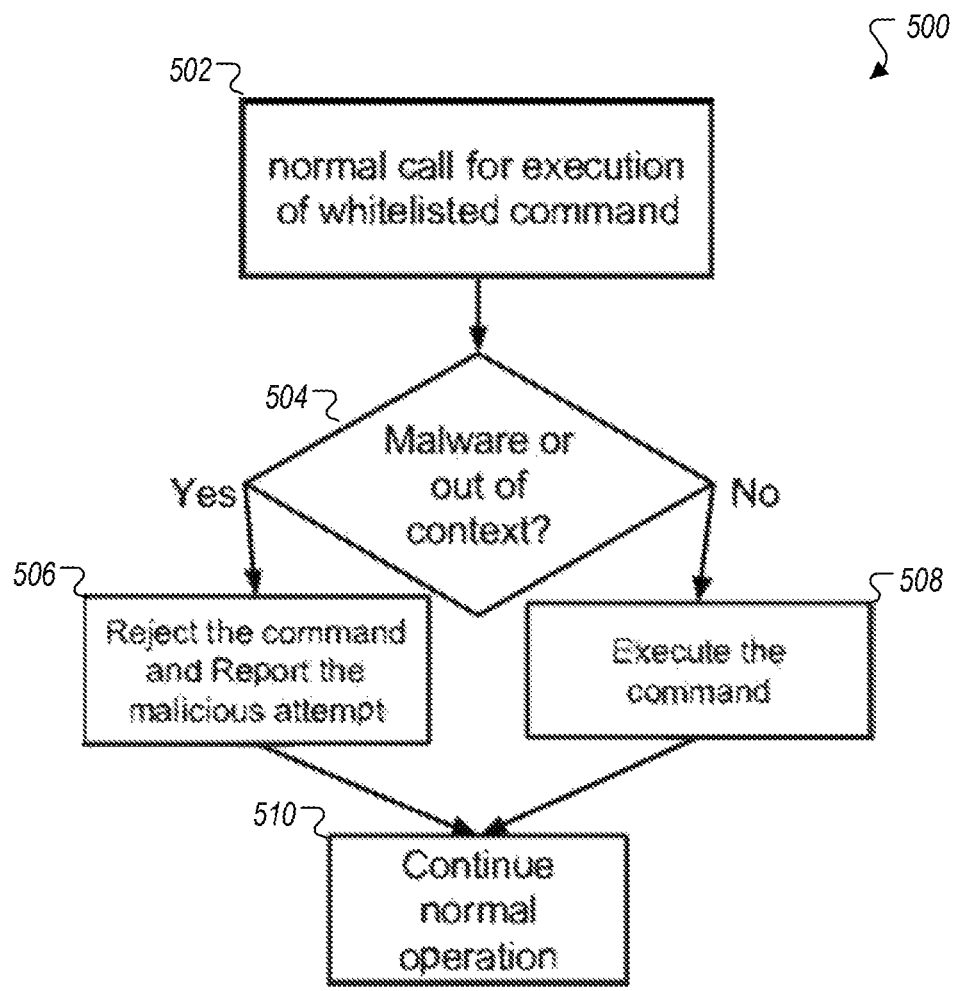
FIG. 5 is a flowchart of an example technique for implementing a context-based whitelist on a controller.

FIG. 5 is a flowchart of an example technique 500 for implementing a context-based whitelist on a controller. The technique 500 can be performed by any of a variety of appropriate controllers, such as the controller 114, the ECUs 156a-n, the controller 202, and/or other controllers. A normal call for execution of a whitelisted command is made (502). The controller retrieves a whitelist element for the command and determines whether the command is for a malware process and, if the command is not malware, whether the process is requested to be performed out of a permitted context (504). If the command is either malware (e.g., signature for the process does not match the signature in the whitelist) or is being performed out of its context, the command is rejected and a report is generated for the malicious attempt (506). If the command passes the whitelist check on both the process signature and the permitted context, then the command is executed (508). The controller then resumes normal operation (510).

Figure 6:
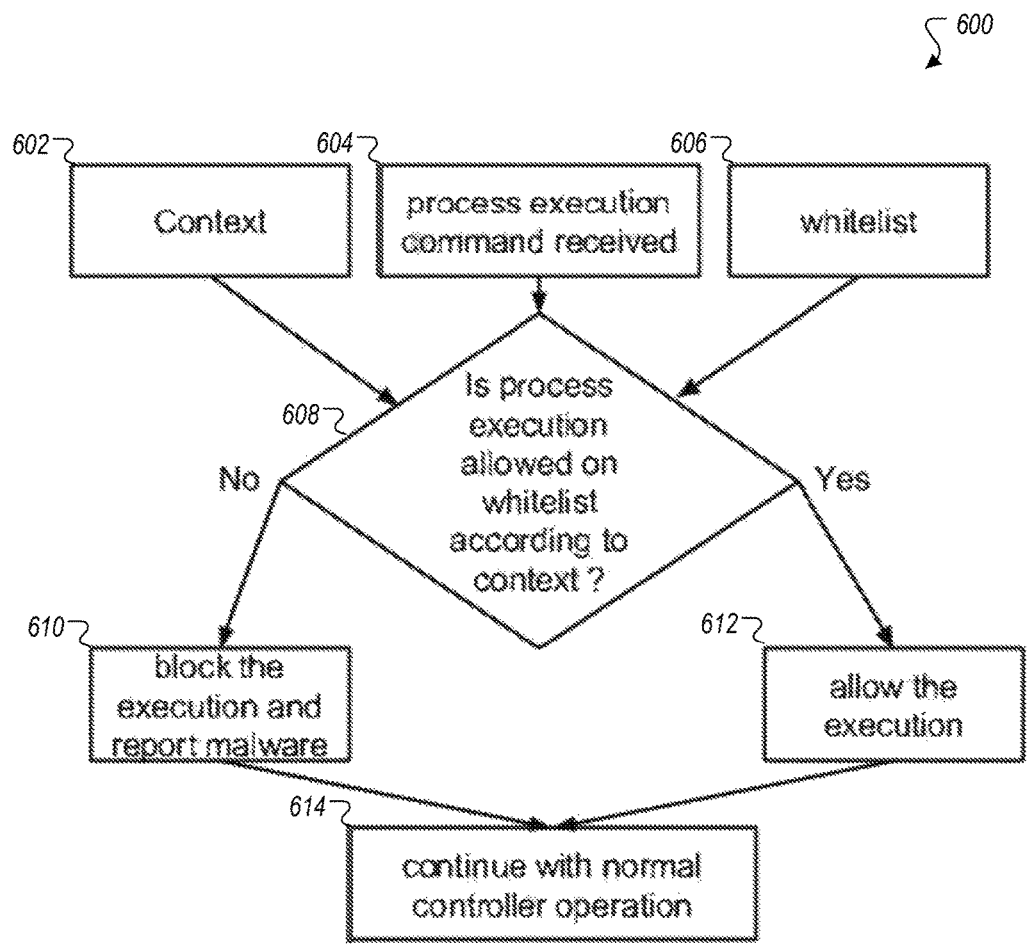
FIG. 6 is a flowchart of an example technique for implementing a context-based whitelist on a controller.

FIG. 6 is a flowchart of an example technique 600 for implementing a context-based whitelist on a controller. The technique 600 can be performed by any of a variety of appropriate controllers, such as the controller 114, the ECUs 156a-n, the controller 202, and/or other controllers. A controller receives a current context (602), a process execution command (604), and a whitelist entry for the process identified in the command (604), and determines whether the process execution is allowed according to the permitted context identified in the whitelist (608). If the context is not included on the whitelisted contexts for the process, then the process execution is blocked and the malware is reported (610). If the context is included on the whitelisted contexts for the process, then the execution of the process can proceed (612). Normal operation of the controller can continue (614).

Figure 7:
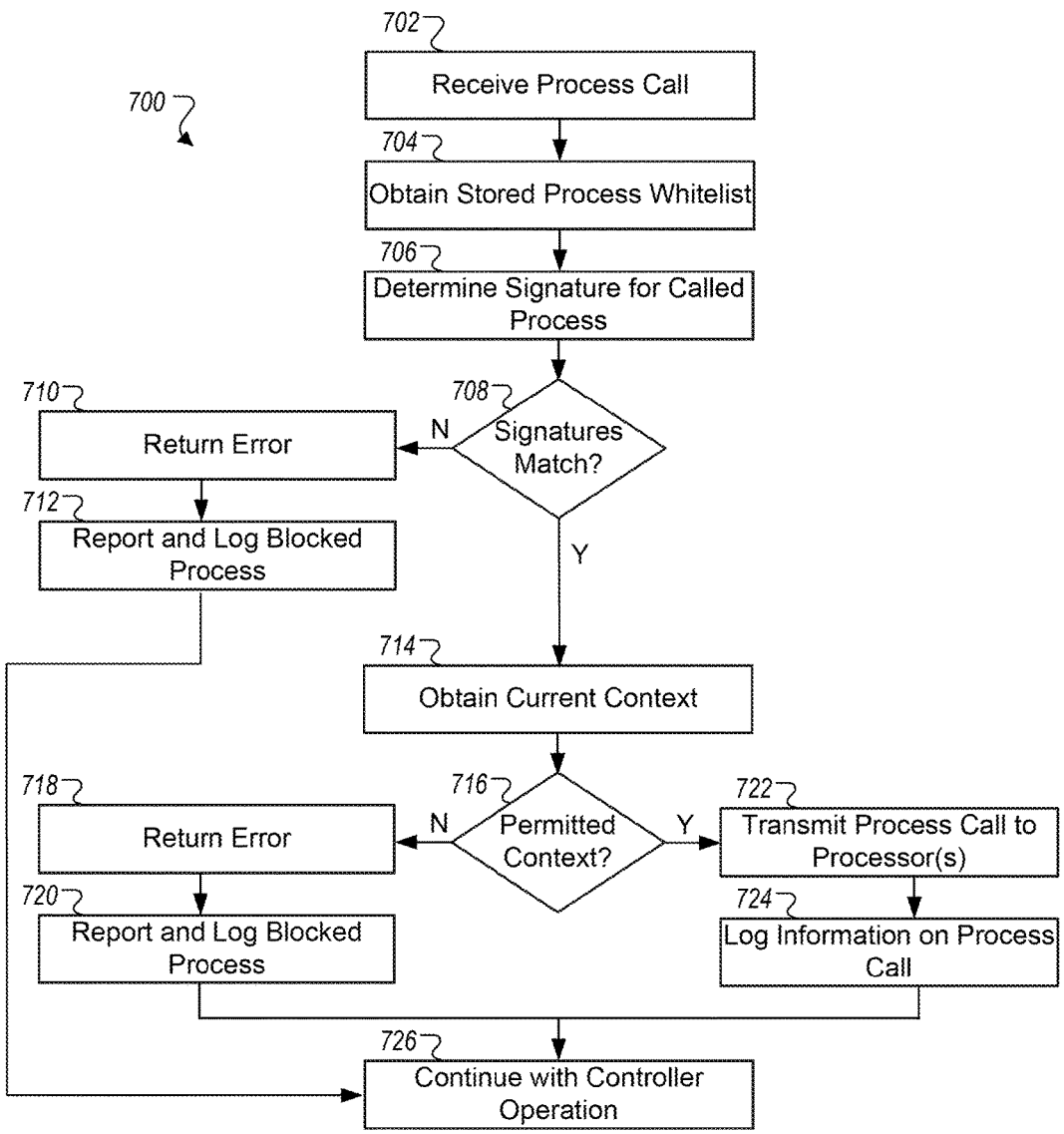
FIG. 7 is a flowchart of an example technique for implementing a context-based whitelist on a controller.

FIG. 7 is a flowchart of an example technique 700 for implementing a context-based whitelist on a controller. The technique 700 can be performed by any of a variety of appropriate controllers, such as the controller 114, the ECUs 156a-n, the controller 202, and/or other controllers. A process call is received (702), which causes the controller to obtain a stored whitelist element for the process (704). The controller can determine a signature for the process call (706) can compare the determined signature against the stored signature for the process in the whitelist (708). If the signatures do not match, then an error can be returned (710), and the process can be blocked from being executed and logged (712). If the signatures do match, then the controller can proceed to check the current context of the controller/device before permitting the process to be executed. To do this, the controller can obtain a current context (714) and determine whether the current context is one of the permitted contexts within which the process can be executed, as defined by the whitelist element for the process (716). If the context is not one of the whitelisted contexts for the process, then an error can be returned (718), and the process can be blocked from being executed and logged (720). If the context is one of the whitelisted contexts for the process, then the process call can be transmitted to the processor for execution (722) and information on the process call can be logged, such as context information when the process call was made (724). The controller can continue with operation (726).

A number of implementations are possible. In one implementation, a method for managing processes in an automotive controller can include receiving a request to run a process execution procedure; based on a current context of at least one automotive system, determining if the process execution procedure is allowable on the automotive controller in the current context in the whitelist; upon a condition in which the process execution procedure is allowable on the automotive controller in the current context in the whitelist, allowing execution of the process execution procedure.

Such an implementation can optionally include one or more of the following features. The receiving, determining and allowing can be executed by the automotive controller. The method can further include executing the process execution procedure by the automotive controller. The automotive controller can be selected from a group including infotainment controller, telematics controller, main computer controller, ABS system controller, navigation system controller, communication system controller, braking system controller, air bag system controller and wheel pressure controller. The process execution procedure can be received in a context of the automotive controller selected from a group consisting of: Initiation state, Shutdown state, Operational state, In motion state.

In another implementation, a method for managing processes in an automotive controller can include receiving a request to load a software library; based on a current context of at least one automotive system, determining if the load a software library is allowable on the automotive controller in the current context in the whitelist; upon a condition in which the load a software library procedure is allowable on the automotive controller in the current context in the whitelist, allowing execution of the load a software library procedure.

Such an implementation can optionally include one or more of the following features. The receiving, determining and allowing can be executed by the automotive controller. The method can further include executing the load a software library procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The load a software library procedure can be received in a context of the automotive controller selected from a group consisting of: Initiation state, Shutdown state, Operational state, In motion state.

In another implementation, a method for managing processes in an automotive controller can include receiving a request to execute a script file; based on a current context of at least one automotive system, determining if the script execution procedure is allowable on the automotive controller in the current context in the whitelist; upon a condition in which the script execution procedure is allowable on the automotive controller in the current context in the whitelist, allowing execution of the script execution procedure.

Such an implementation can optionally include one or more of the following features. The receiving, determining and allowing can be executed by the automotive controller. The method can further include executing the script execution procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The script execution procedure can be received in a context of the automotive controller selected from a group consisting of: Initiation state, Shutdown state, Operational state, In motion state.

In another implementation, a method for managing processes in an automotive controller can include receiving a request to use an operating system resource; based on a current context of at least one automotive system, determining if the use an operating system resource is allowable on the automotive controller in the current context in the whitelist; upon a condition in which the use of an operating system resource procedure is allowable on the automotive controller in the current context in the whitelist, allowing use of the operating system resource procedure.

Such an implementation can optionally include one or more of the following features. The receiving, determining and allowing can be executed by the automotive controller. The method can further include executing the use an operating system resource procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The use of an operating system resource procedure can be received in a context of the automotive controller selected from a group consisting of: Initiation state, Shutdown state, Operational state, In motion state.

In another implementation, an automotive processing system can include a memory unit storing a whitelist; and an automotive controller operable to: receive a request to run a process execution procedure; determine, based on a current context of at least one automotive system, if the process execution procedure is allowable on the automotive controller in the current context in the whitelist; and upon a condition in which the process execution procedure is allowable on the automotive controller in the current context in the whitelist, executing the process execution procedure.

Such an implementation can optionally include one or more of the following features. The receiving, determining and allowing can be executed by the automotive controller. The automotive processing system can further include executing the process execution procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The process execution procedure can be received in a context of the automotive controller selected from a group consisting of: Initiation state, Shutdown state, Operational state, In motion state.

In another implementation, an automotive processing system can include memory unit storing a whitelist; and an automotive controller operable to: receive a request to load a software library; determine, based on a current context of at least one automotive system, if the load a software library procedure is allowable on the automotive controller in the current context in the whitelist; and upon a condition in which the load a software library procedure is allowable on the automotive controller in the current context in the whitelist, executing the load a software library procedure.

Such an implementation can optionally include one or more of the following features. The receiving, determining and allowing can be executed by the automotive controller. The automotive processing system can further include executing the load a software library procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The load a software library procedure can be received in a context of the automotive controller selected from a group consisting of: Initiation state, Shutdown state, Operational state, In motion state.

In another implementation, an automotive processing system can include memory unit storing a whitelist; and an automotive controller operable to: receive a request to execute a script file; determine, based on a current context of at least one automotive system, if the script execution procedure is allowable on the automotive controller in the current context in the whitelist; and upon a condition in which the script execution procedure is allowable on the automotive controller in the current context in the whitelist, executing the script execution procedure.

Such an implementation can optionally include one or more of the following features. The receiving, determining and allowing can be executed by the automotive controller. The automotive processing system can further include executing the script execution procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The script execution procedure can be received in a context of the automotive controller selected from a group consisting of: Initiation state, Shutdown state, Operational state, In motion state.

In another implementation, an automotive processing system can include memory unit storing a whitelist; and an automotive controller operable to: receive a request to use an operating system resource; determine, based on a current context of at least one automotive system, if the use of an operating system resource procedure is allowable on the automotive controller in the current context in the whitelist; and upon a condition in which the use of an operating system resource procedure is allowable on the automotive controller in the current context in the whitelist, allowing use of the operating system resource procedure.

Such an implementation can optionally include one or more of the following features. The receiving, determining and allowing can be executed by the automotive controller. The automotive processing system can further include executing the use an operating system resource procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The use of an operating system resource procedure can be received in a context of the automotive controller selected from a group consisting of: Initiation state, Shutdown state, Operational state, In motion state.

Figure 8:
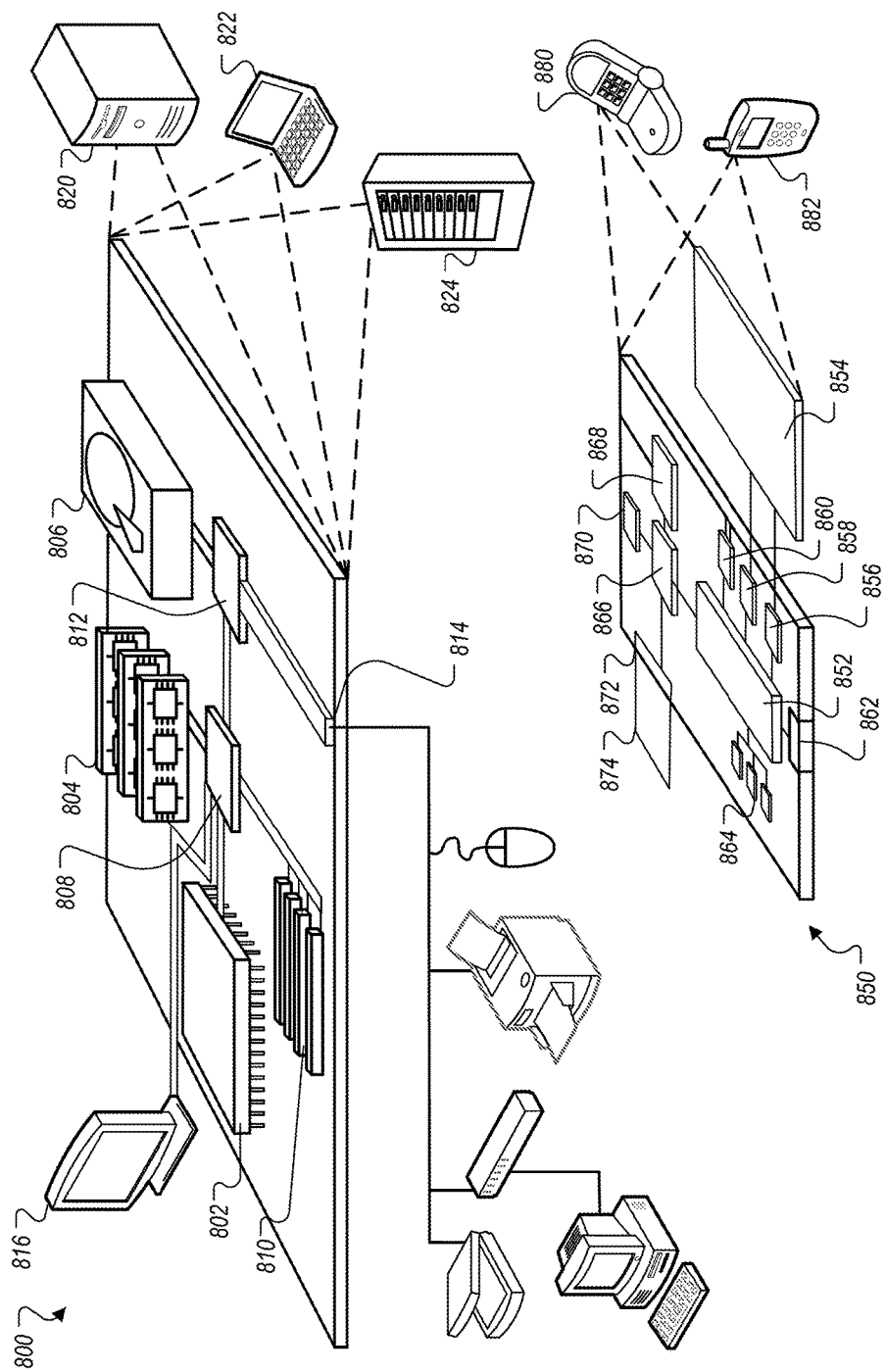
FIG. 8 is a block diagram of example computing devices.

FIG. 8 is a block diagram of example computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 800 is further intended to represent any other typically non-mobile devices, such as televisions or other electronic devices with one or more processers embedded therein or attached thereto. Computing device 850 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 800 includes a processor 802, memory 804, a storage device 806, a high-speed controller 808 connecting to memory 804 and high-speed expansion ports 810, and a low-speed controller 812 connecting to low-speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low-speed controller 812 manages lower bandwidth-intensive operations. Such allocation of duties is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed bus 814. The low-speed bus 814 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as computing device 850. Each of such devices may contain one or more of computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The computing device 850 may also be provided with a storage device, such as a micro-drive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the computing device 850, such as control of user interfaces, applications run by computing device 850, and wireless communication by computing device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of computing device 850 with other devices. External interface 862 may provide, for example, for wired communication (e.g., via a docking procedure) or for wireless communication (e.g., via Bluetooth® or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to computing device 850 through expansion interface 872, which may include, for example, a subscriber identification module (SIM) card interface. Such expansion memory 874 may provide extra storage space for computing device 850, or may also store applications or other information for computing device 850. Specifically, expansion memory 874 may include instructions to carry out or supplement the processes described above, and may include secure information also. Thus, for example, expansion memory 874 may be provide as a security module for computing device 850, and may be programmed with instructions that permit secure use of computing device 850. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Computing device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 868 (e.g., a radio-frequency transceiver). In addition, short-range communication may occur, such as using a Bluetooth®, WiFi, or other such transceiver (not shown). In addition, GPS receiver module 870 may provide additional wireless data to computing device 850, which may be used as appropriate by applications running on computing device 850.

Computing device 850 may also communicate audibly using audio codec 860, which may receive spoken information from a user and convert it to usable digital information. Audio codec 860 may likewise generate audible sound for a user, such as through a speaker, e.g., in a handset of computing device 850. Such sound may include sound from voice telephone calls, may include recorded sound (e.g., voice messages, music files, etc.) and may also include sound generated by applications operating on computing device 850.

The computing device 850 may be implemented in a number of different forms, as shown in the figure. For example, it may be implemented as a cellular telephone 880. It may also be implemented as part of a smartphone 882, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for providing security on an externally connected electronic control unit (ECU) of an automobile, the method comprising:
   launching, by the ECU, a kernel-level security layer that includes a whitelist of permitted processes on the ECU, the whitelist being part of a custom security policy for the ECU and including (i) signatures for processes that are authorized to be executed by the ECU and (ii) real-time ECU operation context information identifying one or more permitted real-time ECU operation contexts within which the processes are authorized to be executed by the ECU;
   receiving, at the kernel-level security layer, a request to run a particular process;
   determining, by the kernel-level security layer, a signature for the particular process;
   determining, by the kernel-level security layer, whether the particular process is permitted to be run on the ECU based on a comparison of the determined signature with a verified signature for the particular process from the whitelist;
   identifying, by the kernel-level security layer, a current real-time ECU operation context;
   determining, by the kernel-level security layer, whether the particular process is permitted to be run on the ECU based on a comparison of the current real-time ECU operation context with one or more permitted real-time ECU operation contexts for the particular process from the whitelist;
   blocking, by the kernel-level security layer, the particular process from running on the ECU based on determining one or more of: (i) the determined signature not matching the verified signature for the process and (ii) the current real-time ECU operation context not being included in the one or more permitted real-time ECU operation contexts; and
   reporting, by the ECU to a server system, information that identifies the particular process as being blocked.

2. The method of claim 1, wherein the whitelist was generated for the ECU based on static analysis of an operating system for the ECU.

3. The method of claim 1, wherein the information is reported to the server system without the particular process being executed by the ECU and without prior transmission with the server system regarding the particular process.

4. The method of claim 1, wherein the ECU is in data communication with other ECUs within the automobile.

5. The method of claim 4, wherein the ECU is selected from the group consisting of: an infotainment controller, a telematics controller, a main computer controller, an ABS system controller, a navigation system controller, a communication system controller, a braking system controller, an air bag system controller, and a wheel pressure controller.

6. The method of claim 4, wherein the one or more permitted real-time ECU operation contexts include one or more of: an initiation state, a shutdown state, an operational state, and an in-motion state.

7. A system for data communication for operation of an automobile, the system comprising:

the automobile, the automobile comprising:

an electronic control unit (ECU) running computer-readable code, the computer-readable code comprising one or more instructions to be performed by the ECU, the instructions comprising:

access a whitelist in the memory;

launch a kernel-level security layer that uses the whitelist defining permitted processes on the ECU, the whitelist being part of a custom security policy for the ECU and including (i) signatures for processes that are authorized to be executed by the ECU and (ii) context information identifying permitted real-time ECU operation contexts within which the processes are authorized to be executed by the ECU;

receive a request to run a particular process;

determine a signature for the particular process;

determine whether the particular process is permitted to be run on the ECU based on a comparison of the determined signature with a verified signature for the particular process from the whitelist;

identify a current real-time ECU operation context;

determine whether the particular process is permitted to be run on the ECU based on a comparison of the current real-time ECU operation context with one or more permitted real-time ECU operation contexts for the particular process from the whitelist;

block the particular process from running on the ECU based on determining one or more of: (i) the determined signature not matching the verified signature for the process and (ii) the current real-time ECU operation context not being included in the one or more permitted real-time ECU operation contexts; and report, to a server system, information that identifies the particular process as being blocked.

8. The system of claim 7, wherein the whitelist was generated for the ECU based on static analysis of an operating system for the ECU.

9. The system of claim 7, wherein the information is reported to the server system without the particular process being executed by the ECU and without prior transmission with the server system regarding the particular process.

10. The system of claim 7, wherein the ECU is in data communication with other ECUs within the automobile.

11. The system of claim 10, wherein the ECU is selected from the group consisting of: an infotainment controller, a telematics controller, a main computer controller, an ABS system controller, a navigation system controller, a communication system controller, a braking system controller, an air bag system controller, and a wheel pressure controller.

12. The system of claim 10, wherein the one or more permitted real-time ECU operation contexts include one or more of: an initiation state, a shutdown state, an operational state, and an in-motion state.

* * * * *